United States Patent
Oliva Llena et al.

(10) Patent No.: US 10,527,324 B2
(45) Date of Patent: Jan. 7, 2020

(54) MACHINE FOR AIR-COOLED ABSORPTION

(71) Applicant: UNIVERSITAT POLITÈCNICA DE CATALUNYA, Barcelona (ES)

(72) Inventors: Asensio Oliva Llena, Sabadell (ES); Carlos David Pérez Segarra, Terrassa (ES); Joaquim Rigola Serrano, Rubi (ES); Jesús Castro González, Terrassa (ES); Carles Oliet Casasayas, Bigues i Riells (ES); Ivette Rodríguez Pérez, Terrassa (ES); Oriol Lehmkuhl Barba, Terrassa (ES); Xavi Trias Miquel, Sant Cugat (ES); Roser Capdevila Paramio, Terrassa (ES); Ramiro Alba Queipo, Sabadell (ES); Manuel Miguel Ordoño Martinez, Terrassa (ES); Joan Farnos Baluenas, Manresa (ES)

(73) Assignee: Universitat Politècnica de Catalunya, Barcelona (ES)

( * ) Notice: Subject to any disclaimer, the term of this patent is extended or adjusted under 35 U.S.C. 154(b) by 341 days.

(21) Appl. No.: 14/898,206

(22) PCT Filed: Jun. 6, 2014

(86) PCT No.: PCT/ES2014/070468
§ 371 (c)(1),
(2) Date: Dec. 14, 2015

(87) PCT Pub. No.: WO2014/198983
PCT Pub. Date: Dec. 18, 2014

(65) Prior Publication Data
US 2016/0146514 A1 May 26, 2016

(30) Foreign Application Priority Data

Jun. 14, 2013 (ES) .................................. 201330887

(51) Int. Cl.
*F25B 15/06* (2006.01)

(52) U.S. Cl.
CPC .................................. *F25B 15/06* (2013.01)

(58) Field of Classification Search
CPC .......... F25B 15/06; F25B 37/00; F28F 9/0282; F28F 25/04; Y02A 30/277; Y02A 30/62
See application file for complete search history.

(56) References Cited

U.S. PATENT DOCUMENTS

| | | | | |
|---|---|---|---|---|
| 2,072,423 A | * | 3/1937 | Dillman | .................. F25B 49/04 62/147 |
| 2,221,971 A | * | 11/1940 | Haywood | ............. F25B 27/007 62/235.1 |

(Continued)

FOREIGN PATENT DOCUMENTS

| | | |
|---|---|---|
| DE | 102007062343 | 6/2009 |
| EP | 0216629 | 4/1987 |

(Continued)

*Primary Examiner* — Kun Kai Ma
(74) *Attorney, Agent, or Firm* — Robert J. Hess; Hess Patent Law Firm

(57) ABSTRACT

The invention relates to the design of an air cooled absorption machine. Said machine has a hollow design via which air can circulate inside same by forced convention having a parallelepiped form. The air enters by suction via the sides and leaves via the upper face of the machine, where the ventilator is located. The machine comprises falling-film heat exchangers with improved designs for heat and mass transfer.

13 Claims, 4 Drawing Sheets

(56) References Cited

U.S. PATENT DOCUMENTS

| | | | | |
|---|---|---|---|---|
| 2,615,686 | A | * | 10/1952 | Davidson ................. F25B 37/00 165/117 |
| 2,894,380 | A | * | 7/1959 | Palmatier .............. F25B 39/026 62/476 |
| 3,150,796 | A | * | 9/1964 | Cronelid ............... F25D 11/027 220/592.1 |
| 3,318,588 | A | * | 5/1967 | Russell .................. B01D 53/18 165/110 |
| 3,407,625 | A | * | 10/1968 | McDonald .............. F25B 15/04 62/476 |
| 3,528,489 | A | * | 9/1970 | Bell, Jr. .................. F25B 15/06 165/58 |
| 3,593,540 | A | * | 7/1971 | Hopkins ................ F25B 15/06 62/476 |
| 3,605,436 | A | * | 9/1971 | Gammill, Jr. ......... F25B 15/004 62/476 |
| 3,828,575 | A | * | 8/1974 | Malcosky ................. F24F 1/02 62/476 |
| 3,962,887 | A | * | 6/1976 | Bressendorff .......... F25B 15/04 62/485 |
| 3,964,273 | A | * | 6/1976 | Merrick ................. F25B 37/00 62/476 |
| 4,512,394 | A | * | 4/1985 | Kauffman ................ C02F 1/16 165/86 |
| 4,563,882 | A | | 1/1986 | Kunugi et al. |
| 4,646,541 | A | * | 3/1987 | Reid, Jr. ................ C09K 5/047 62/476 |
| 4,655,053 | A | | 4/1987 | Kunugi et al. |
| 4,691,528 | A | | 9/1987 | Tongu |
| 4,748,830 | A | | 6/1988 | Oouchi et al. |
| 4,791,790 | A | | 12/1988 | Tongu |
| 4,841,744 | A | | 6/1989 | Kurosawa |
| 4,872,319 | A | | 10/1989 | Tongu |
| 5,027,616 | A | | 7/1991 | Tongu |
| 5,077,986 | A | * | 1/1992 | Cook .................... F25B 15/025 62/483 |
| 5,207,075 | A | * | 5/1993 | Gundlach ............. F24F 5/0017 237/2 B |
| 5,259,203 | A | * | 11/1993 | Engel .................... B01D 5/0039 62/150 |
| 5,259,205 | A | | 11/1993 | Takahata et al. |
| 5,783,119 | A | * | 7/1998 | Ulrich ................... B01D 3/008 261/110 |
| 6,109,060 | A | * | 8/2000 | Shimomae ........... F25D 23/003 62/476 |
| 6,192,976 | B1 | * | 2/2001 | Yoshida ............... B23K 1/0012 165/171 |
| 2003/0041608 | A1 | * | 3/2003 | Gonzalez-Cruz ..... F25B 27/007 62/235.1 |
| 2003/0167790 | A1 | * | 9/2003 | Koike .................... F25B 15/04 62/476 |

FOREIGN PATENT DOCUMENTS

| | | |
|---|---|---|
| EP | 0317048 | 5/1991 |
| ES | 2159250 B1 | 9/1999 |
| JP | 63065257 | 3/1988 |
| JP | 2251067 | 10/1990 |
| JP | 9014787 | 1/1997 |
| JP | 10281581 | 10/1998 |
| JP | 10300268 | 11/1998 |
| JP | 3091664 B2 | 9/2000 |
| JP | 3105177 B2 | 10/2000 |
| WO | WO 2009004008 | 1/2009 |
| WO | WO 2009102271 | 8/2009 |
| WO | WO 2014/198983 A1 | 12/2014 |

\* cited by examiner

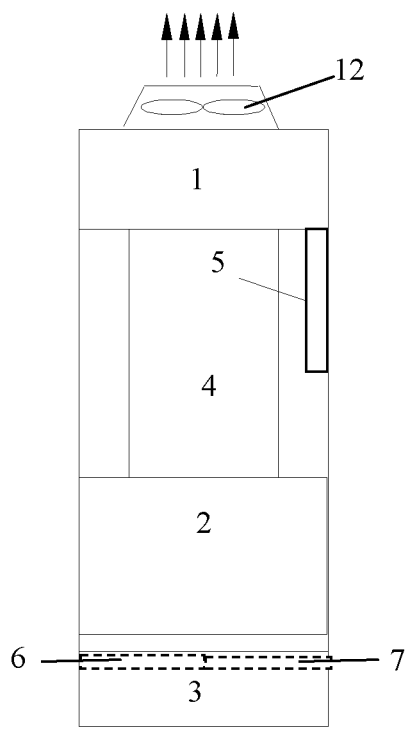
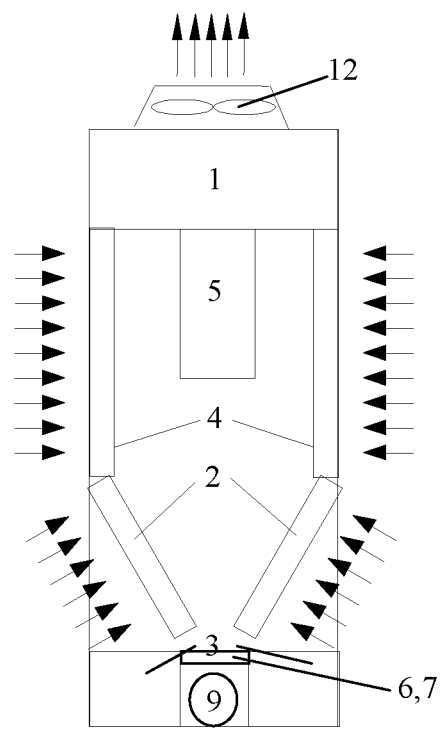
Fig.9A    Fig.9B
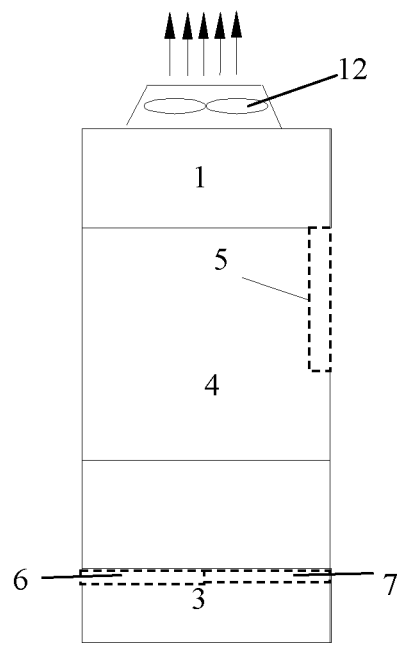
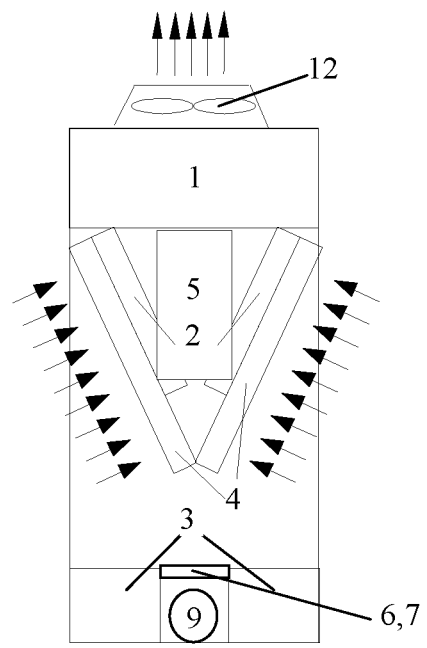
Fig. 10A    Fig. 10B

MACHINE FOR AIR-COOLED ABSORPTION

OBJECT OF THE INVENTION

The present invention relates to the design of an air-cooled absorption refrigerating machine that uses water as coolant and aqueous lithium bromide to be used in air-conditioning applications and whose energy source is hot water.

STATE OF THE ART

There are currently a lot of technologies to create cold from a thermal energy source; for instance, refrigeration through absorption, adsorption, ejection, cold through desiccants, the Rankine cycle, the Stirling cycle, etc. These technologies are particularly attractive to diminish the demand for electrical energy and to replace the traditional systems of vapour compression. This may mean remarkable savings from the energy and, consequently, economic perspectives, provided the thermal energy source has a low price; for instance, solar energy or residual heat from an industrial process.

Absorption refrigeration is one of the several existent technologies to create cold from a thermal energy source, and it is one of the most widespread. Absorption refrigerating machines have been around since the $19^{th}$ century and throughout the $20^{th}$ century several makers of medium/large capacity (above 100 kW) machines have made their niche in the market. All these machines use either water (coolant)/aqueous lithium bromide (absorber), or ammonium (coolant)/ammonia liquor (absorber) as working fluids. The machines that use water as coolant are adequate for air-conditioning applications, and the machines that use ammonium as coolant for refrigeration applications.

During that time, the Yazaki company has been a unique case. See, for instance, U.S. Pat. No. 4,014,183, "Absorption refrigerator of natural circulation type," with its low power models in the range of 7-50 kW. All these machines use water and lithium bromide as working fluids.

In the first decade of the $21^{st}$ century there was a strong development of low-power absorption machines, particularly those of water/aqueous lithium bromide. See Patents DE102007062343 "Cold production method for water lithium bromide absorption refrigerant plant, involves receiving water vapor by mixing absorber, and supplying lithium bromide solution into cooling part via desorber" and WO2009004008 "Absorption refrigerating machine."

There is a water/aqueous lithium chloride machine working in open cycle that has as one further characteristic the ability to store thermochemical energy. As one illustrative patent, see reference WO2009102271, "Absorption machine having a built-in energy storage tank working according to the matrix method."

All the commercial machines described above are cooled by water and they use water as the coolant and aqueous lithium bromide as the absorber, and they need a cooling tower for their operation.

For low power machines dispensing with the cooling tower is attractive, since that would make the system cheaper. Up to now, some developments of air-cooled absorption machines have been made that use water/aqueous lithium bromide, none of which have become commercially viable. We shall mention Patents JP63065257 "Air-cooling type absorption water chiller and heater," JP2251067 "Absorption type air-cooled heat pump cooling and heating device," JP3091664 "Air-cooled absorption type heating and cooling equipment," JP3105177 "Air-cooled absorption type water cooling and heating machine," JP10281581 "Air-cooling absorption freezer and cold/warm water heater," EP0317048 "Air-cooled absorption type water cooling and heating generating apparatus," EP0216629 "Air-cooled absorption type water cooling/heating apparatus," U.S. Pat. No. 4,563,882 "Air-cooling type absorption cooler," U.S. Pat. No. 4,655,053 "Air-cooled absorption refrigeration system, U.S. Pat. No. 4,691,528 "Air-cooled absorption type water cooling/heating apparatus," U.S. Pat. No. 4,748,830 "Air-cooled absorption heating and cooling system," U.S. Pat. No. 4,748,830 "Air-cooled absorption heating and cooling system," U.S. Pat. No. 4,791,790 "Air-cooled absorption-type water cooling and heating apparatus," U.S. Pat. No. 4,872,319 "Air-cooled absorption type cooling/heating water generating apparatus," U.S. Pat. No. 4,841,744 "Double-effect air-cooled absorption refrigerating machine," U.S. Pat. No. 5,027,616 "Air-cooled absorption type cooling and heating apparatus" and ES2159250B1 "Máquina de absorción de doble efecto enfriada por afire y alimentada por el calor de los gases de escape de motores térmicos." In all these developments, the cycle configuration is one of double effect, gas being the energy source except for the last case (Patent ES2159250B1), so in these cases the generator or desorber is adapted to such characteristics. U.S. Pat. No. 6,109,060, titled "Air-cooled absorption type refrigerating apparatus," relates to an air-cooled absorption machine with different configurations of its elements.

As for components, absorption refrigerating machines are made up by an array of heat exchangers, pumps and valves. In the case of machines using water/aqueous lithium bromide, a rather usual type of heat exchanger is of the film descending type, since this does not involve a large pressure loss on the side of the primary fluid or coolant (water/aqueous lithium bromide). This is an important characteristic, since these machines work at subatmospheric pressures. In Patents JP3091664, JP3105177, JP63065257, JP9014787, JP10030860, JP10281581, JP10300268, U.S. Pat. No. 4,655,053 reference is made to vertical film absorbers. There is another absorber configuration, known as adiabatic absorption in droplets, which appears in Patent ES2161119, "Absorbedor de gotas iguales de flujos paralelos," which is also appropriate in subatmospheric conditions. In Patents JP10300273 and JP10300274, "Evaporator unit for air-cooling absorption type freezing device," descending film evaporators are described.

Another type of exchanger appropriate for machines that use water/aqueous lithium bromide is the flooded variety, which can be used in evaporators and/or generators. There is one further component, the solution exchanger, which is a liquid-liquid exchanger, which can be a plate or a shell and tube exchanger.

U.S. Pat. No. 4,563,882 discloses An air cooling type absorbing cooler provided with an air cooling type absorber having a structure in which, in cooling the absorbing solution and the refrigerant vapour by air, the absorbing solution and the refrigerant vapour on the inlet side of the absorber are cooled by the cooling air on the outlet side of the absorber, while the absorbing solution on the outlet side of the absorber is cooled by the cooling air on the outlet side.

PURPOSE OF THE INVENTION

The purpose of the present invention is to improve the design of an absorption refrigerating machine directly cooled by air that works with hot water as the energy source, with a single effect configuration.

It specifically relates to the spatial arrangement of its components—absorber, generator, solution exchanger, condenser, evaporator, solution pump, solution and coolant storage tanks—, to some design details of the heat exchangers and to the design of its distributors, which is essential to achieve a good wetting of the descending film heat exchangers that require it: the absorber and the generator.

DISCLOSURE OF THE INVENTION

The absorption refrigerating machine that is the subject of the current invention presents a single effect cycle configuration. The basic single effect absorption cycle consists of one absorber, one generator, one solution exchanger, one evaporator, one condenser, one pump and two expansion valves (see FIG. 1).

The absorption refrigerating machine whose invention is herein referred to is characterised by having a parallelepiped shape (see FIG. 2) inside of which all components are located. Said components are arranged so that they leave its central part hollow, so that air circulation is permitted in its interior. In the upper part of the machine a fan is located that moves the air in forced convection through the finned tube exchangers, these being located on two of the lateral sides of the parallelepiped, so that air is drawn inside through the finned exchangers, circulates upwards through the central hollow part and exits through the fan by the top of the machine. These finned exchangers are the absorber and the condenser, which, in turn, may be divided into two parts, and located on just two sides, setting up what is termed parallel installation. The fan is located on the upper side of the parallelepiped, just above the generator, and the latter, in turn, above the solution exchanger and the absorbers. The solution exchanger will be at such a height that its top will be level with the upper part of the absorbers. All the elements are arranged in the shape of a hollow box, the interior allowing for the possibility of free circulation of the air in forced convection being drawn inside by the condensers and the absorbers, exiting through the fan by the top of the machine. The solution and coolant storage tanks are located at the bottom of the parallelepiped without hindering the passage of air.

The generator is located in the upper part of the machine, under the fan and above the absorber or absorbers and the solution exchanger, to facilitate the return flow from the generator to the absorber.

The absorber is located under the generator, high enough relative to the pump.

The solution exchanger is located under the generator and in the upper part of the absorber, in order to facilitate the return flow from the generator to the absorber.

The evaporator is located at the bottom.

The absorber is a finned tube exchanger (see FIG. 3). Inside it the primary fluid—the aqueous solution of lithium bromide—circulates absorbing water vapour in the shape of a vertically descending liquid film. In this process, the heat and mass transfer is effected simultaneously, as described in the reference: Grossman, G. "Simultaneous heat and mass transfer in film absorption under laminar flow." On the outside of the tubes the air cooling the exchanger circulates. In order to ensure an adequate liquid film flow, a descending film former is installed in the upper part of the tubes. Two options are presented: i) a cylinder with a threaded hole and slots which engages the tube; ii) a film former based on passing the solution through a very narrow annular conduit (see FIG. 4).

The condenser is a finned tubed exchanger. Inside it the primary fluid—condensed water—circulates. On the outside of the tubes the air cooling the exchanger circulates (see FIG. 5).

The generator is a coil exchanger of horizontal tubes, where the primary fluid (an aqueous solution of lithium bromide) circulates on the outside of the tubes and the secondary fluid (hot water) circulates inside them. Wire netting is installed to facilitate the wetting on the horizontal coil. Two threaded rods are located between one tube and the next so as to ensure a good distribution of the liquid in the shape of a descending film on the generator coil. The generator tubes subtend an angle relative to the horizontal smaller than 0.5°, so that they do not constitute a helical coil by virtue of oblique links that make up one of the corners. The liquid distributor consists of a tube with gaged holes that equitably shares out the aqueous solution of lithium bromide on the first tube (see FIG. 6).

The evaporator is of the flooded type. This type of evaporators avoids the need for coolant pumps. It consists of a bundle of finned tubes (see FIG. 6).

The passage between the evaporator and the absorber, and between the generator and the condenser is sufficient to minimise pressure losses and to achieve the proper operation of the machine.

Under no circumstances the binding of members of different metals is to be brought together is to be done through welding, but effected through polymeric, elastomeric or rigid joints.

The solution and coolant tanks have enough capacity to let them operate in the right working concentration range and enough capacity to thermochemically store energy. The solution tank is divided in two, and is located above the pump to ensure the latter's priming. The coolant tank, however, is unique, and is also located above the pump. It is used both to adjust the concentration level and to anticipate the decrystallisation process.

Other details and characteristics will be shown in the following description, wherein different examples of the invention are shown by way of non-limiting examples, along with the relevant Figures.

Herein below is a list of the different parts of the invention that are identified in the attached Figures with the help of numbers: (1) generator, (2) condenser, (3) evaporator, (4) absorber, (5) solution exchanger, solution storage tank, coolant storage tank, (8) expansion valves, (9) pump, (10) liquid conduits, (11) vapour conduits, (12) fan, (13) liquid distributor, (14) liquid film former, (15) redistributing rod, (16) wire netting covering, (17) finned tube.

DESCRIPTION OF THE DRAWINGS

FIG. 9A and FIG. 9B are basic schemes of the views of the third preferred embodiment of the machine wherein the absorbers (5) and the condensers (2) can be seen in parallel, the latter being formed at an angle to the vertical.

FIG. 10A and FIG. 10B are basic schemes of the views of the fourth preferred embodiment of the machine wherein the absorbers (5) and the condensers (2) can be seen in series, the latter being formed at an angle to the vertical.

DESCRIPTION OF THE PREFERRED EMBODIMENTS OF THE INVENTION

Figure 1:
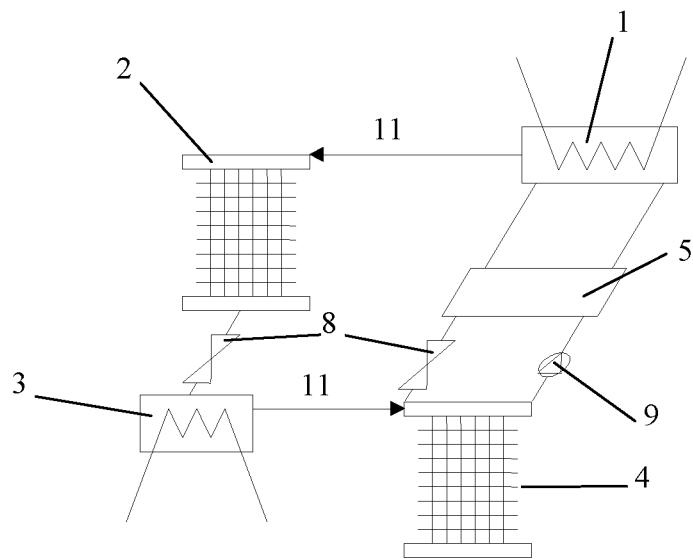
FIG. 1 portrays the basic absorption cycle.
Figures 2A, 2B:
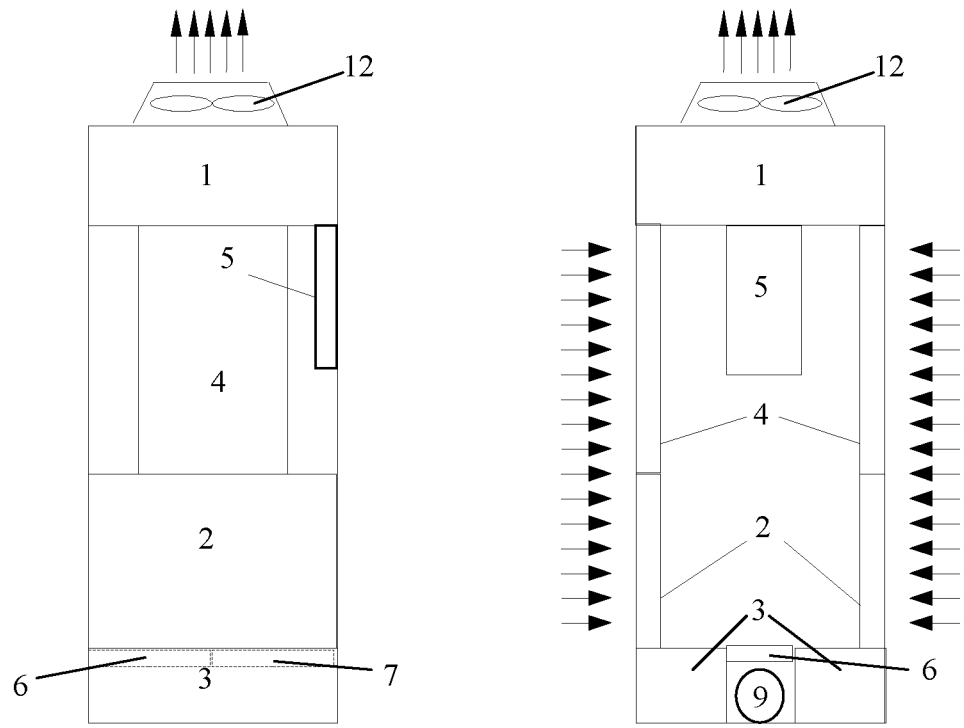
FIG. 2A and FIG. 2B are basic diagrams of the views of the first preferred embodiment of the machine wherein the absorbers (5) and the condensers (2) can be seen in parallel.
Figure 3:
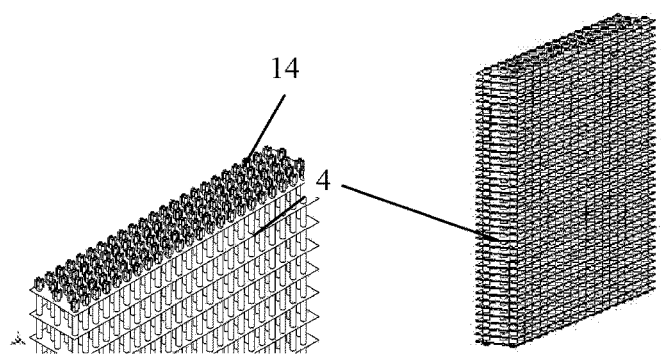
FIG. 3 shows schematic representations of the air-cooled absorber (4), where in the view on the left the top of the absorber (4) is shown as having the liquid film formers (14), and in the view on the right the entire absorber (4) can be seen.
Figure 4:
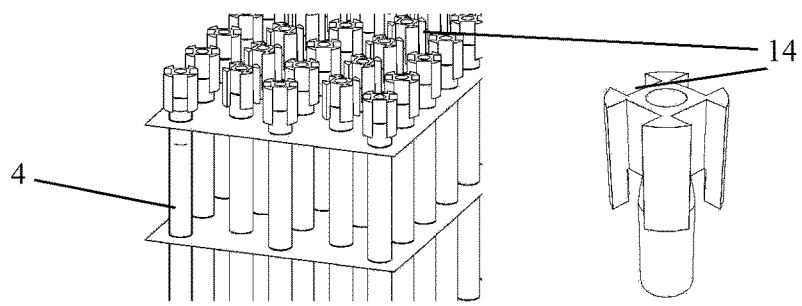
FIG. 4 shows schematic representations of the annular liquid film formers (14), where in the view on the left a detail thereof (14) located in the upper part of the absorber (4) can be seen, and in the view on the right a film former (14) can be seen by itself.
Figure 5:
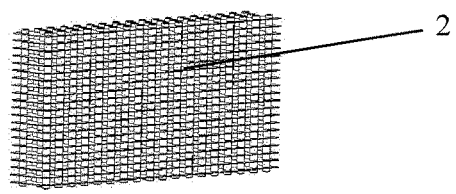
FIG. 5 is a schematic representation of the air-cooled condenser (2).
Figure 6:
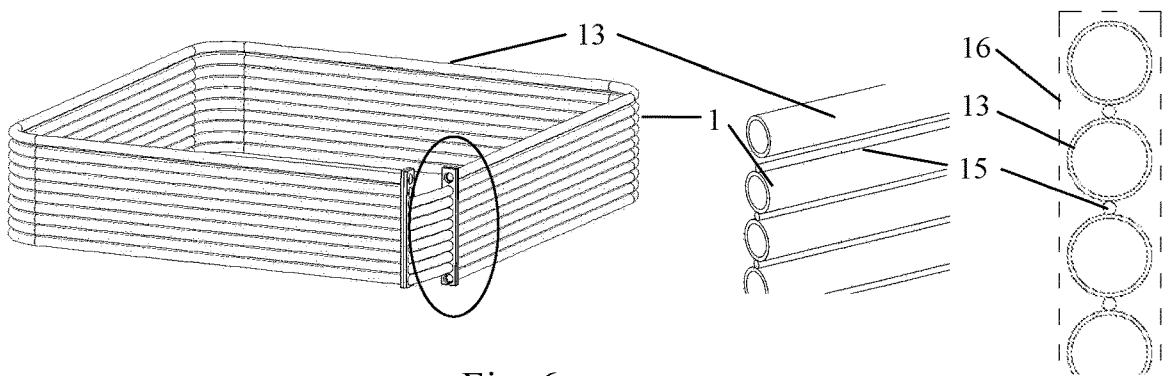
FIG. 6 is a schematic representation of the coil generator (1) with the distributor (13) on top. The structural detail of the coil corner can be seen highlighted. On the right there is a section of the tubes of the generator (1), with the redistributing rods (15) located therebetween.
Figure 7:
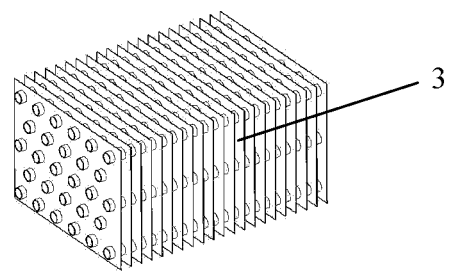
FIG. 7 is a schematic representation of the flooded evaporator (3), which consists of a bundle of finned tubes.

The preferred embodiment of the present invention is laid out with a parallelepiped shape inside of which the different components (see FIG. 2A and FIG. 2B) are located: generator (1), condensers (2), evaporators (3), absorbers (4), solution exchanger (5), solution storage tank, coolant storage tank, expansion valves (8), pump (9), liquid conduits (10), vapor conduits (11), fan (12). While the basic absorption cycle consists of one generator (1), one condenser (2), one evaporator (3), one absorber (4), one solution exchanger (5), two expansion valves (8) and one solution pump (9) that can be mechanical or thermal (see FIG. 1), in the preferred embodiment the condenser (2), the evaporator (3) and the absorber (4) are divided into two equal parts. The air-cooled exchangers, that is, the absorbers (4) and the condensers (5), are located on opposite vertical sides of the parallelepiped, whose lengths will be the larger thereof. The absorbers (4) will be located above the condensers. The solution pump (9) will be located at the bottom of the parallelepiped, in the middle of the two evaporators (3). The advantage of this preferred embodiment is that it ensures the intake of fresh air both in the condensers and the absorbers, thanks to their parallel arrangement, with a maximum of frontal area, with minimal pressure loss in the air flow.

Figure 8A:
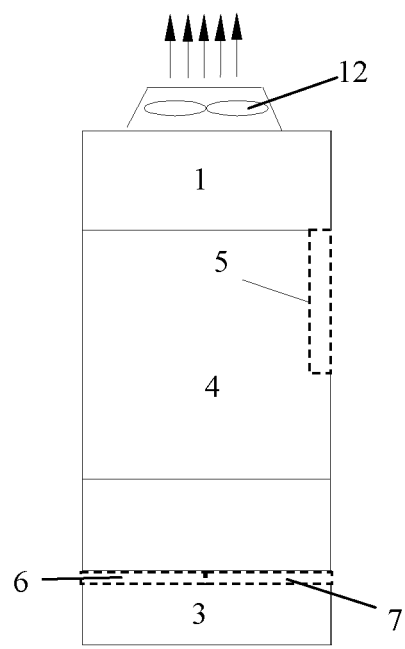
FIG. 8A and FIG. 8B are basic schemes of the views of the second preferred embodiment of the machine wherein the absorbers (5) and the condensers (2) can be seen in series.
Figure 8B:
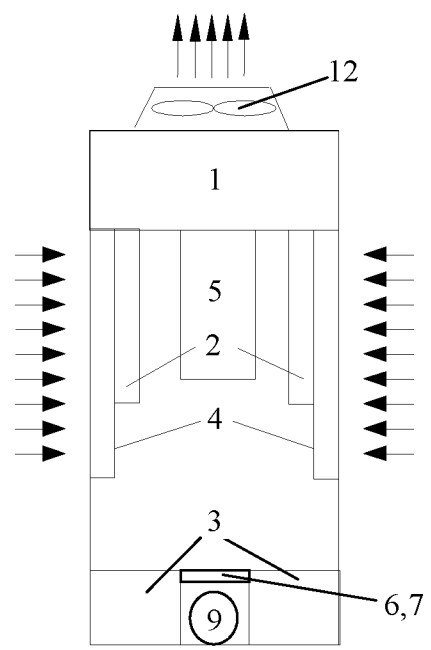

Another preferred embodiment is the arrangement of the array of condensers (2) and absorbers (4) in series (see FIG. 8), twice of each in this case. The rest of the main components—generator (1), evaporator (3), solution exchanger (5), solution storage tank, coolant storage tank, expansion valves (8), pump (9), fan (12)—would stay the same as the above preferred form, except for the liquid (10) and vapor conduits (11), which are adapted to the new arrangement of the air-cooled components. The main advantage of this arrangement is that it occupies a smaller frontal area.

As an alternative preferred embodiment, an arrangement of the array of condensers (2) and absorbers (4) in parallel is laid out, but with the condensers (2) subtending some angle to the vertical (see FIG. 9A and FIG. 9B). The rest of the main components—generator (1), evaporator (3), solution exchanger (5), solution storage tank, coolant storage tank, expansion valves (8), pump (9), fan (12)—would stay the same as the above preferred form, except for the liquid (10) and vapor conduits (11), which are adapted to the new arrangement of the air-cooled components. The main advantage of this arrangement is that it facilitates the suction of the air flow, reducing pressure losses on the fan, combining the advantage of the first preferred embodiment, that is, maximizing the frontal area.

One alternative as a preferred embodiment is the arrangement of the array of condensers (2) and absorbers (4) in series, but with the absorbers (4) and condensers (2) subtending some angle to the vertical (see FIG. 10A and FIG. 10B). The rest of the main components—generator (1), evaporator (3), solution exchanger (5), solution storage tank, coolant storage tank, expansion valves (8), solution pump (9), fan (12)—would stay the same as the above preferred form, except for the liquid (10) and vapor conduits (11), which are adapted to the new arrangement of the air-cooled components. The main advantage of this arrangement is that it facilitates the suction of the air flow, combining the advantage of the second preferred embodiment, that is, occupying a smaller frontal area.

The invention claimed is:

1. An air-cooled absorption machine using water as coolant, an aqueous solution of lithium bromide as absorbent, and a hot fluid that supplies primary energy, the air-cooled absorption machine having a hollow configuration of vertical development and including:
    a generator,
    at least one condenser,
    at least one evaporator,
    at least one absorber,
    a solution heat exchanger,
    a solution storage tank and a coolant storage tank,
    a single mechanical or thermal solution pump, and
    a single fan,
    wherein said hollow configuration of vertical development includes the at least one absorber, the at least one condenser and the solution heat exchanger,
    wherein the generator has an annular configuration and is located in the upper part of the air-cooled absorption machine, above the at least one absorber and under the single fan,
    wherein the at least one evaporator, the at least one absorber and the at least one condenser are divided into evaporator parts, absorber parts and condenser parts, respectively,
    wherein the hollow configuration of vertical development is formed by evaporator parts, absorber parts and condenser parts, and wherein:
    the evaporator parts are located at a bottom of the air-cooled absorption machine, the absorber parts are located under the generator and above the single mechanical or thermal solution pump, a top of the absorber parts being level with the upper part of the solution heat exchanger, and
    the single fan is located on the top of the air-cooled absorption machine, on an upper side of the hollow configuration of vertical development, the air being drawn inside from said respective opposite walls of the hollow configuration of vertical development through the at least one condenser and the at least one absorber and is propelled in a forced convection circulation through said hollow configuration of vertical development exiting through the single fan only at the top of the air-cooled absorption machine, through the generator;

wherein the air-cooled absorption machine presents a single effect cycle by including the generator and using a hot water as the energy source to work with the air, and wherein the at least one absorber comprises an array of air-cooled finned tube exchangers wherein inside the at least one absorber the aqueous solution of lithium bromide circulates absorbing water vapour in the shape of a vertically descending liquid film by a descending liquid film former installed in an upper part of the air-cooled finned tube exchangers, ensuring an adequate liquid film flow, and the at least one evaporator is a flooded type evaporator.

2. The air-cooled absorption machine according to claim 1, wherein said hollow configuration of vertical development has a parallelepiped shape cooperating on said air circulation in forced convection without hindering the passage of air.

3. The air-cooled absorption machine according to claim 1, wherein the generator consists of a coil of horizontal tubes that exchanges energy with a heat-bearing fluid that supplies the primary energy.

4. The air-cooled absorption machine according to claim 1, wherein the condenser consists of an array of air-cooled finned tubes.

5. The air-cooled absorption machine according to claim 3, wherein the generator comprises the coil of horizontal tubes which has some redistributing threaded rods located between said coil of horizontal tubes and a wire netting covering to facilitate the wetting of the coil of horizontal tubes.

6. The air-cooled absorption machine according to claim 5, wherein the coil of horizontal tubes of the generator subtend, at most, an angle of 0.50 relative to the horizontal.

7. The air-cooled absorption machine according to claim 1, wherein the descending liquid film formers are of two types:
   i) having a cylinder with a threaded hole and slots which engages the air-cooled finned tube exchangers;
   ii) having a film former based on passing the solution through narrow annular conduit.

8. The air-cooled absorption machine according to claim 1, wherein the solution storage tank is located above the solution pump.

9. The air-cooled absorption machine according to claim 1, wherein the coolant storage tank is located above the solution pump.

10. The air-cooled absorption machine according to claim 1, wherein the at least one mechanical or thermal solution pump solution pump is located at a bottom part of the hollow configuration of vertical development of the air-cooled absorption machine.

11. The air-cooled absorption machine according to claim 1, wherein the condenser parts and the absorbers parts are laid out in parallel, but with the condenser parts subtending some angle with respect to the vertical sides of the hollow configuration of vertical development.

12. The air-cooled absorption machine according to claim 1, wherein the condenser parts and absorber parts are laid out in series, but with the absorber parts and the condenser parts subtending some angle with respect to the vertical sides of the hollow configuration of vertical development.

13. An air-cooled absorption machine using water as coolant, an aqueous solution of lithium bromide as absorbent, and a hot fluid that supplies primary energy, the air-cooled absorption machine having a hollow configuration of vertical development and parallelepiped shape and including:
   a generator,
   at least one condenser,
   at least one evaporator,
   at least one absorber,
   a solution heat exchanger,
   a solution storage tank and a coolant storage tank,
   a single mechanical or thermal solution pump, and
   a single fan,
   wherein said hollow configuration of vertical development and parallelepiped shape includes the at least one absorber, the at least one condenser and the solution heat exchanger,
   wherein the generator has an annular configuration and is located in the upper part of the air-cooled absorption machine, above the at least one absorber and under the single fan,
   wherein the at least one evaporator, the at least one absorber and the at least one condenser are divided into evaporator parts, absorber parts and condenser parts, respectively,
   wherein the hollow configuration of vertical development and parallelepiped shape is formed by evaporator parts, absorber parts and condenser parts, and wherein:
   the evaporator parts are located at a bottom part of the air-cooled absorption machine, the absorber parts are located under the generator and above the single mechanical or thermal solution pump, a top of the absorber parts being level with the upper part of the solution heat exchanger, and
   the single fan is located on the top of the air-cooled absorption machine, on an upper side of the hollow configuration of vertical development and parallelepiped shape, the air being drawn inside from said respective opposite walls of the hollow configuration of vertical development and parallelepiped shape through the condensers and the absorbers and is propelled in a forced convection circulation through said hollow configuration of vertical development and parallelepiped shape exiting through the fan only at the top of the air-cooled absorption machine, through the generator;
   wherein the air-cooled absorption machine presents a single effect cycle by including the generator and using a hot water as the energy source to work with the air, and wherein:
   the at least one absorber comprises an array of air-cooled finned tube exchangers wherein inside the at least one absorber the aqueous solution of lithium bromide circulates absorbing water vapour in the shape of a vertically descending liquid film by a descending liquid film former installed in an upper part of the tube exchangers, ensuring an adequate liquid film flow, and
   the at least one evaporator is of a flooded type evaporator.

* * * * *